(12) United States Patent
Giovanardi et al.

(10) Patent No.: US 11,991,308 B2
(45) Date of Patent: May 21, 2024

(54) CALL VOLUME PREDICTION

(71) Applicant: Zoom Video Communications, Inc., San Jose, CA (US)

(72) Inventors: Davide Giovanardi, Stanford, CA (US); Andrew Miller-Smith, Chicago, IL (US)

(73) Assignee: Zoom Video Communications, Inc., San Jose, CA (US)

( * ) Notice: Subject to any disclaimer, the term of this patent is extended or adjusted under 35 U.S.C. 154(b) by 174 days.

(21) Appl. No.: 17/390,761

(22) Filed: Jul. 30, 2021

(65) Prior Publication Data
US 2023/0036270 A1    Feb. 2, 2023

(51) Int. Cl.
*H04M 3/36*       (2006.01)
*G06N 20/00*      (2019.01)
*H04M 3/523*      (2006.01)

(52) U.S. Cl.
CPC ............ *H04M 3/362* (2013.01); *G06N 20/00* (2019.01); *H04M 3/365* (2013.01); *H04M 3/5238* (2013.01); *H04M 2203/55* (2013.01)

(58) Field of Classification Search
None
See application file for complete search history.

(56) References Cited

U.S. PATENT DOCUMENTS

| | | | | |
|---|---|---|---|---|
| 7,076,036 | B1 * | 7/2006 | Johnson | H04M 15/8016 379/112.01 |
| 7,817,789 | B2 * | 10/2010 | Ferguson | H04Q 3/0025 379/221.03 |
| 11,368,588 | B1 * | 6/2022 | Johnston | G06N 20/00 |
| 11,425,252 | B1 * | 8/2022 | Martin | H04M 3/5141 |
| 2017/0316438 | A1 * | 11/2017 | Konig | G06Q 30/016 |
| 2020/0136975 | A1 * | 4/2020 | Arora | H04L 43/045 |
| 2021/0081970 | A1 * | 3/2021 | Fama | G06Q 10/06393 |
| 2021/0224862 | A1 | 7/2021 | Taifi et al. | |
| 2022/0180276 | A1 * | 6/2022 | Silverman | G06Q 10/06315 |

OTHER PUBLICATIONS

International Search Report and Written Opinion dated Nov. 18, 2022 in corresponding PCT Application No. PCT/US2022/038528.
Combining time-series and textual data for taxi demand prediction in event areas: a deep learning approach, Filipe Rodrigues et al., Technical University of Denmark, Aug. 17, 2018, 20 pages.

(Continued)

*Primary Examiner* — Quoc D Tran
(74) *Attorney, Agent, or Firm* — Young Basile Hanlon & MacFarlane, P.C.

(57) ABSTRACT

A sequence of call volume measurements is accessed, where each of the call volume measurements is associated with respective metadata. The respective metadata may provide information regarding a time period during which a call volume measurement was made. A window of the sequence of call volume measurements with the respective metadata is input to a machine learning model to obtain a prediction of a call volume. The machine learning model includes embedding functions that are applied to the respective metadata for the call volume measurements in the window.

20 Claims, 6 Drawing Sheets

(56) References Cited

OTHER PUBLICATIONS

Time Series Forecasting with Deep Learning and Attention Mechanism, Marcon Del Pra, Towards Data Science, Nov. 2, 2020, 21 pages.
A Better Way? Forecasting with Embeddings, Emilio Lapiello, BCG GAMMA, Medium, https://medium.com/bcggamma/a-better-way-forecasting-with-embeddings-8f45e7065f2b, Jun. 13, 2019, 8 pages.
Attention for time series forecasting and classification, Isaac Godfried, Towards Data Science, https://towardsdatascience.com/attention-for-time-series-classification-and-forecasting-261723e0006d, Apr. 9, 2019, 11 pages.
Time2Vec for Time Series features encoding, Marcon Cerliani, Towards Data Science, https://towardsdatascience.com/time2vec-for-time-series-features-encoding-a03a4f3f937e, Sep. 25, 2019, 5 pages.
Deep Transformer Models for Time Series Forecasting: The Influenza Prevalence Case, Neo Wu et al., Jan. 23, 2020, 10 pages.

\* cited by examiner

CALL VOLUME PREDICTION

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
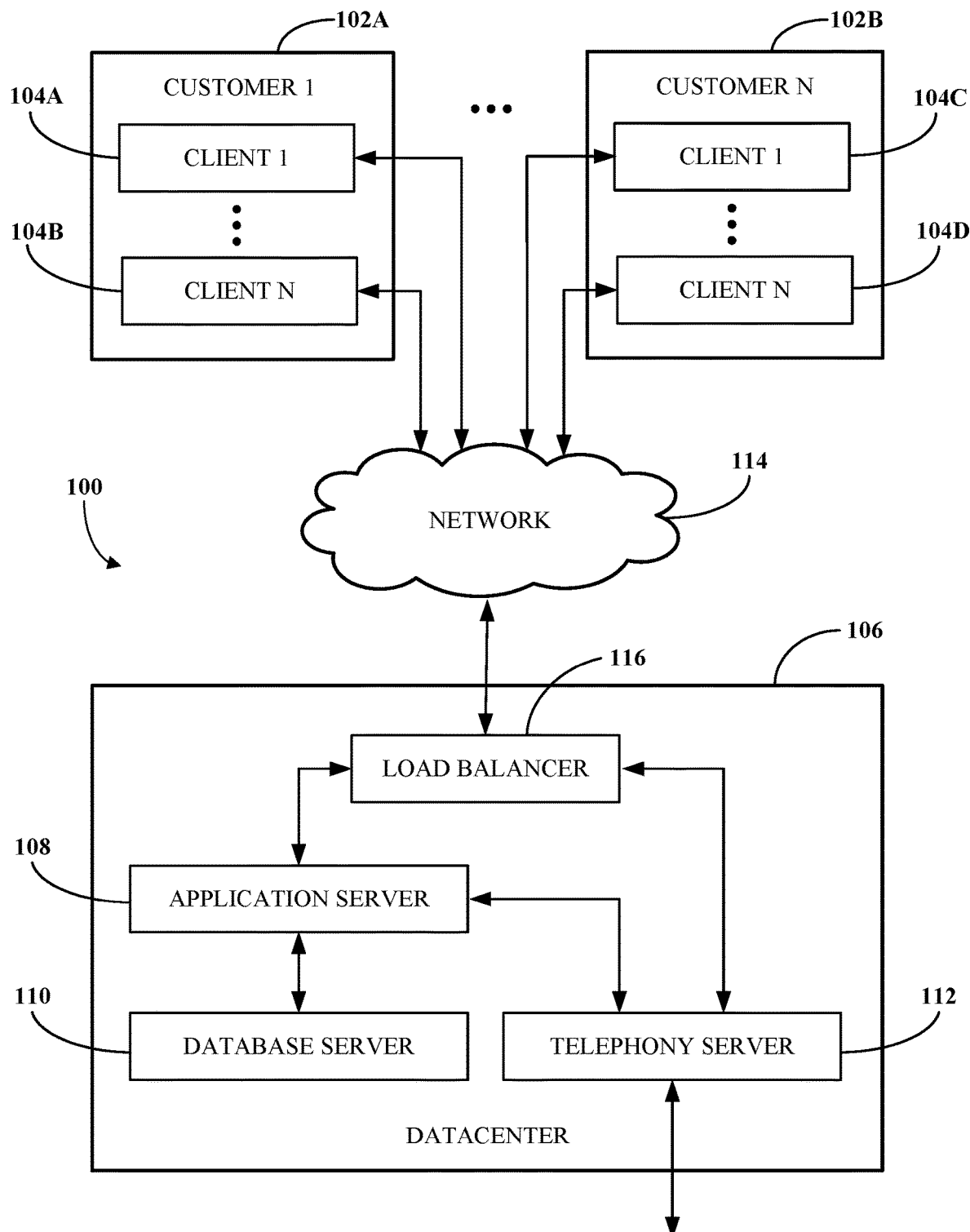
FIG. 1 is a block diagram of an example of an electronic computing and communications system.

Disclosed herein are, inter alia, implementations of systems and techniques for call volume prediction.

One aspect of this disclosure is a method comprising accessing a sequence of call volume measurements for a unified communications as a service platform, wherein each of the call volume measurements is associated with respective metadata, and wherein the respective metadata provides information regarding a time period during which a call volume measurement was made; and inputting a window of the sequence of call volume measurements with the respective metadata to a machine learning model to obtain a prediction of a call volume for the unified communications as a service platform, wherein the machine learning model includes embedding functions that are applied to the respective metadata for the call volume measurements in the window.

One aspect of this disclosure is a system comprising a processor and a memory, wherein the memory stores instructions executable by the processor to access a sequence of call volume measurements for one or more telephony servers, wherein each of the call volume measurements is associated with respective metadata, and wherein the respective metadata provides information regarding a time period during which a call volume measurement was made; and input a window of the sequence of call volume measurements with the respective metadata to a machine learning model to obtain a prediction of a call volume for the one or more telephony servers, wherein the machine learning model includes embedding functions that are applied to the respective metadata for the call volume measurements in the window.

One aspect of this disclosure is a non-transitory computer-readable storage medium, comprising executable instructions that, when executed by a processor, facilitate performance of operations, comprising accessing a sequence of call volume measurements for a unified communications as a service platform, wherein each of the call volume measurements is associated with respective metadata, and wherein the respective metadata provides information regarding a time period during which a call volume measurement was made; inputting a window of the sequence of call volume measurements with the respective metadata to a machine learning model to obtain a prediction of a call volume for the unified communications as a service platform, wherein the machine learning model includes embedding functions that are applied to the respective metadata for the call volume measurements in the window; and activating one or more telephony servers based on the prediction of the call volume for the unified communications as a service platform.

It is advantageous for software platforms, such as UCaaS platforms to be able to predict time series data, such as call volumes or network traffic, for its infrastructure. Machine learning models can be trained to make predictions based on time series data, but they often require vast amounts of training data to achieve satisfactory performance for a given application. There is a desire to be able provide accurate predictions based on sometimes limited data sets. For example, data sets may be limited where a new website or cloud service is in an early phase of production and has a limited user base. In such a case, a machine learning model that needs to be trained from random or default initial conditions may have insufficient training data to converge to a state that will enable it to provide reasonably accurate predictions. These predictions can be used to manage resources of a UCaaS platform, such as for deploying servers.

Implementations of this disclosure address problems such as these by applying a machine learning model (e.g., including a deep learning neural network) with learned embeddings to time series data with associated metadata to obtain predictions of the time series value. For example, a call volume in a period of time may be predicted based on call volume data for a sequence of time bins (e.g., every minute, hour, or day) in a window of preceding time (e.g., the last 72 hours). In some implementations, each time bin is associated with metadata, such as day of week, hour of day, day of month, holiday, part of business cycle, weather, and/or tide. Embeddings are learned continuous vector representations of discrete variables. These pieces of metadata may be mapped to embedding vectors using trained embedding functions. The embedding functions may be implemented with a set of parameters that control linear and/or nonlinear functions applied to a discrete input to map the discrete variable to a (approximately) continuous vector space, called an embedding space. These parameters may be adapted or trained as part of a training process for a larger machine learning model in which they are included (e.g., trained using a back propagation algorithm). In some implementations, the embeddings may be trained in one machine learning model and copied into another machine learning model applied in a related but different application to transfer information relevant to both problems from one machine learning model to the other machine learning model. The resulting embedding vectors may be input to a deep neural network along with the corresponding time series data (e.g., representative of call volumes over some period of time) to make a prediction for an upcoming time bin. In some implementations, the embedding functions for the metadata may have been trained using data for another time series that is similar to the time series currently being analyzed. For example, embedding functions may be trained based on website traffic data and transferred to a machine learning model for predicting call volumes in a telephony system.

Some implementations described herein may provide advantages, such as providing accurate prediction for call volume or other types of network traffic based on limited data sets. For example, the predictions may enable an efficient deployment of computing resources in a telecommunications infrastructure. For example, servers (e.g., telephony servers) may be activated or deactivated responsive to a prediction of call volume being above or below a threshold.

To describe some implementations in greater detail, reference is first made to examples of hardware and software structures used to implement call volume prediction. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs the same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs the same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
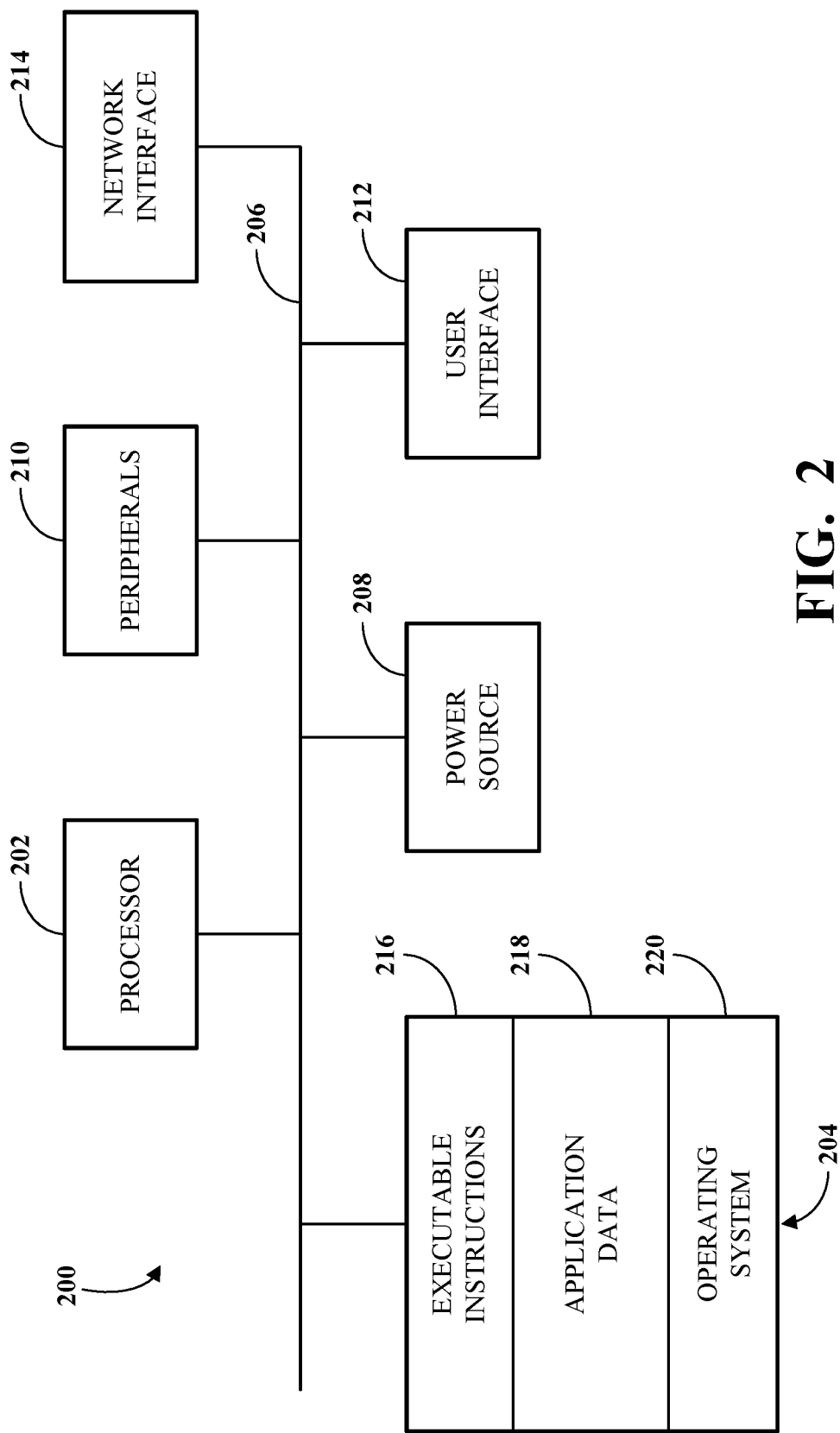
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, phase-change memory, or another form of non-volatile memory configured for persistent electronic information storage. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®, an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
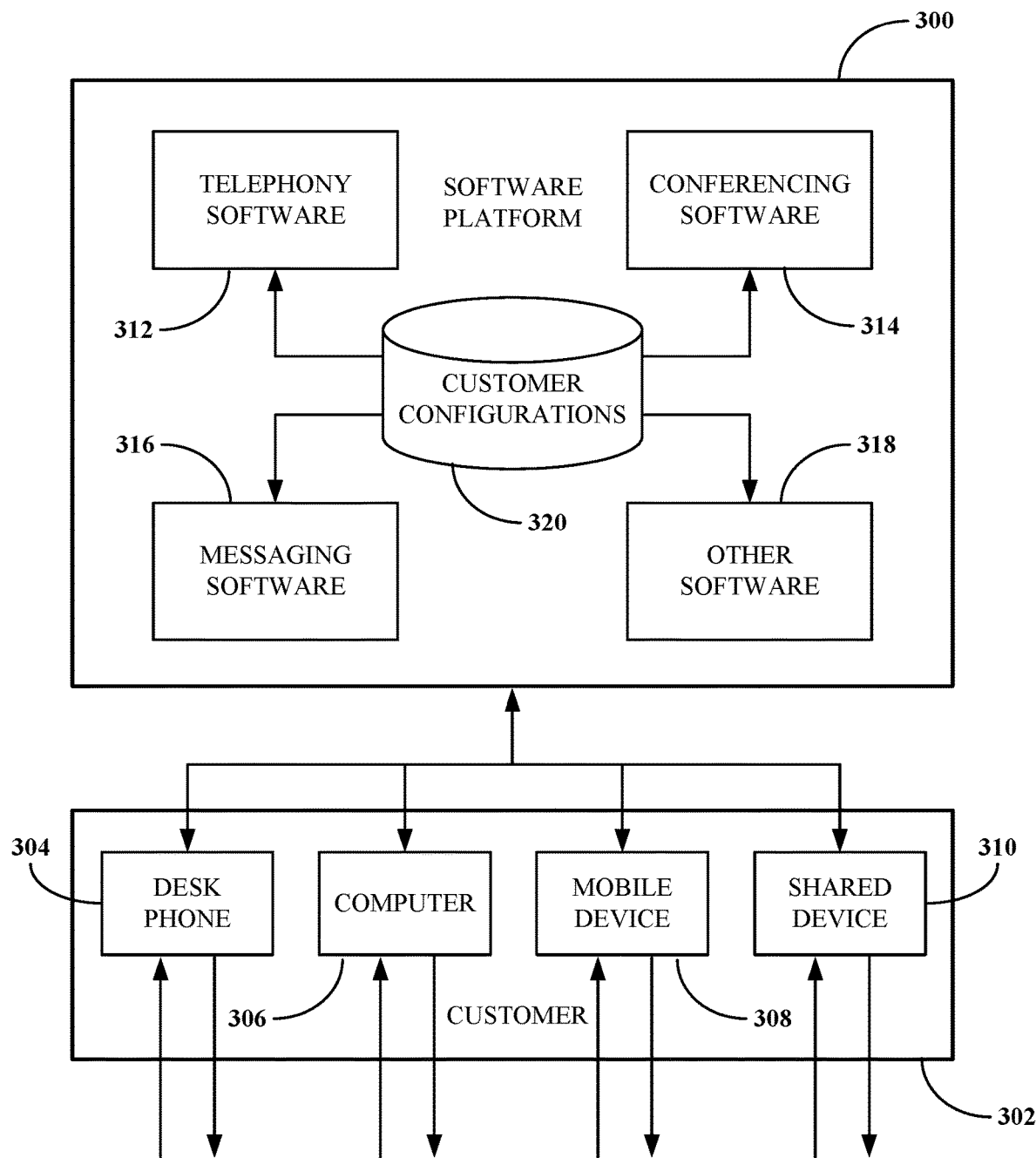
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include implementations of a machine learning model with learned embeddings that takes time series data (e.g., call volume measurements) with associated metadata as input to obtain predictions of the time series value (e.g., a call volume prediction). In some implementations, the embedding functions for the metadata may have been trained using data for another time series that is similar to the time series currently being analyzed.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
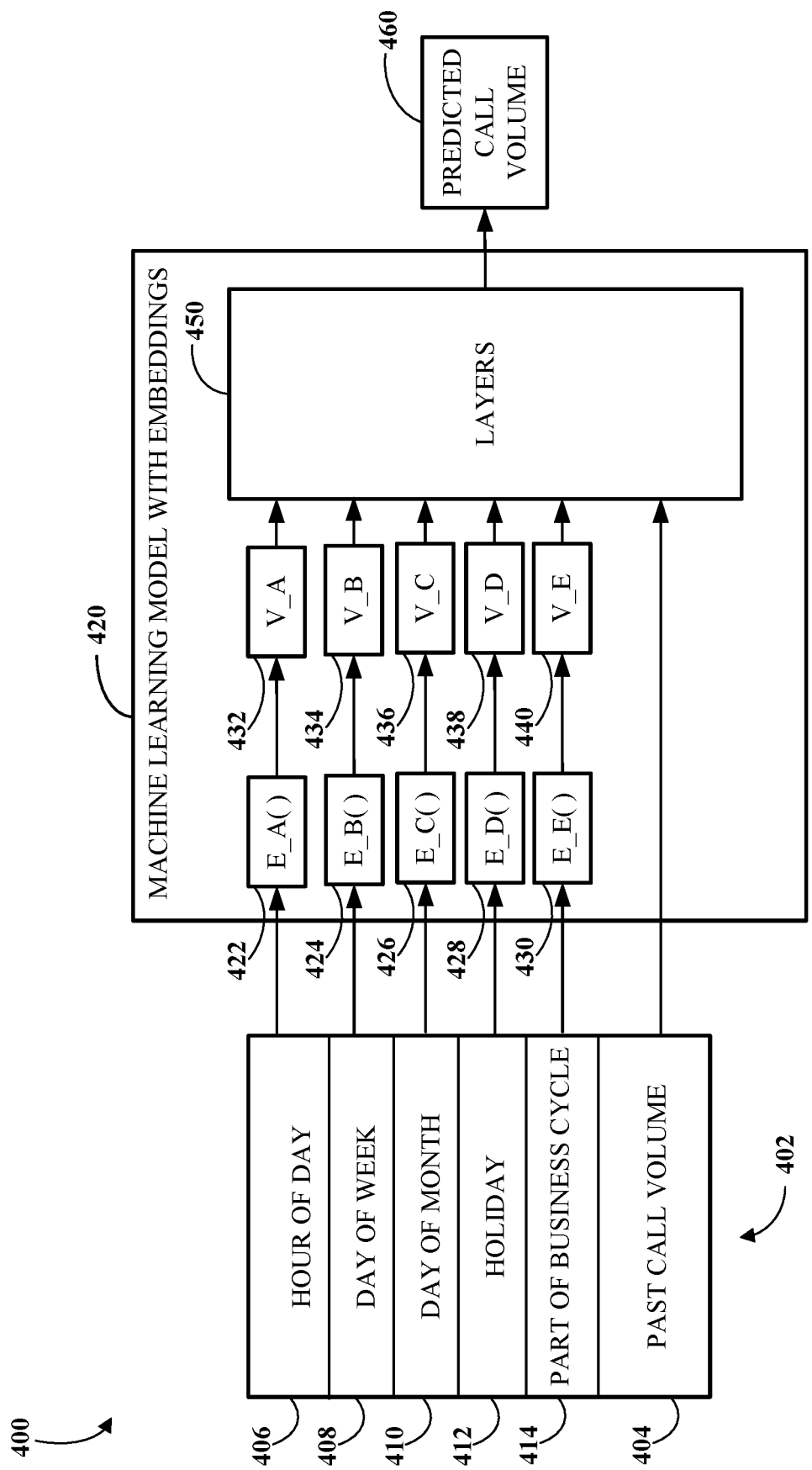
FIG. 4 is a block diagram of an example of a system for call volume prediction based on a time series of call volume data with time bin metadata.

FIG. 4 is a block diagram of an example of a system 400 for call volume prediction based on a time series of call volume data with time bin metadata. The system 400 includes a machine learning model 420 with embedding functions (422, 424, 426, 428, and 430). The machine learning model 420 is configured to take a window of a sequence of call volume measurements with the respective metadata as input and output a predicted call volume 460. FIG. 4 depicts a sequence element 402 that includes a past call volume 404 (e.g., a call volume measurement) and metadata for a time interval or bin corresponding to the past call volume 404 (e.g., a time period during which a call volume measurement was made). In this example, the metadata of the sequence element 402 includes an hour of the day 406, a day of the week 408, a day of the month 410, a holiday identifier 412 indicating proximity to one or more holidays, and a part of the business cycle 414 indicating a current phase in a business cycle. For simplicity, FIG. 4 only depicts a single sequence element 402 being input to the machine learning model 420, but in practice a larger window of samples from this sequence may be input to the machine learning model 420 to obtain the predicted volume 460.

The machine learning model 420 includes embedding functions (422, 424, 426, 428, and 430) that are applied to the respective metadata for the call volume measurements in the window. When a window of sequence elements, including the sequence element 402, is input to the machine learning model 420, the metadata of the sequence element 402 are input to the corresponding embedding functions (422, 424, 426, 428, and 430) that have been trained to map these metadata to corresponding vectors (432, 434, 436, 438, and 440) in an embedding space. In some implementations, the embedding space for a piece of metadata may have a higher or lower dimension than the metadata itself. The machine learning model 420 also includes layers 450 (e.g., deep neural network layers) that take the embedding vectors (432, 434, 436, 438, and 440) along with the past call volume 404 as inputs and outputs the predicted call volume 460. For example, the layers 450 may include fully connected layers, convolutional layers, pooling layers, and/or recurrent layers. The predicted call volume 460 may be used to provision resources in network infrastructure. For example, one or more telephony servers may be activated based on the predicted call volume 460 for a UCaaS platform or a separate telephony platform.

In some implementations (not shown in FIG. 4), the machine learning model 420 may standardize or normalize the call volume measurements by mapping them to another space. For example, the call volume measurements may be shifted by a mean of call volume measurements in a set of training data or scaled by a standard deviation of call volume measurements in a set of training data.

In some implementations, the embedding functions (422, 424, 426, 428, and 430) have been trained using a sequence of network traffic measurements other than call volume measurements. For example, the embedding functions (422, 424, 426, 428, and 430) may have been trained using a sequence of website traffic measurements. The embedding functions (422, 424, 426, 428, and 430) may serve to tackle the so-called cold start problem via transferring their learned parameters from a similar time series problem (e.g., website traffic prediction) to a new problem (e.g., call volume prediction) to reduce the amount of training data and time required to converge to a state with acceptably accurate predictions, a method referred to as transfer learning.

Figure 5:
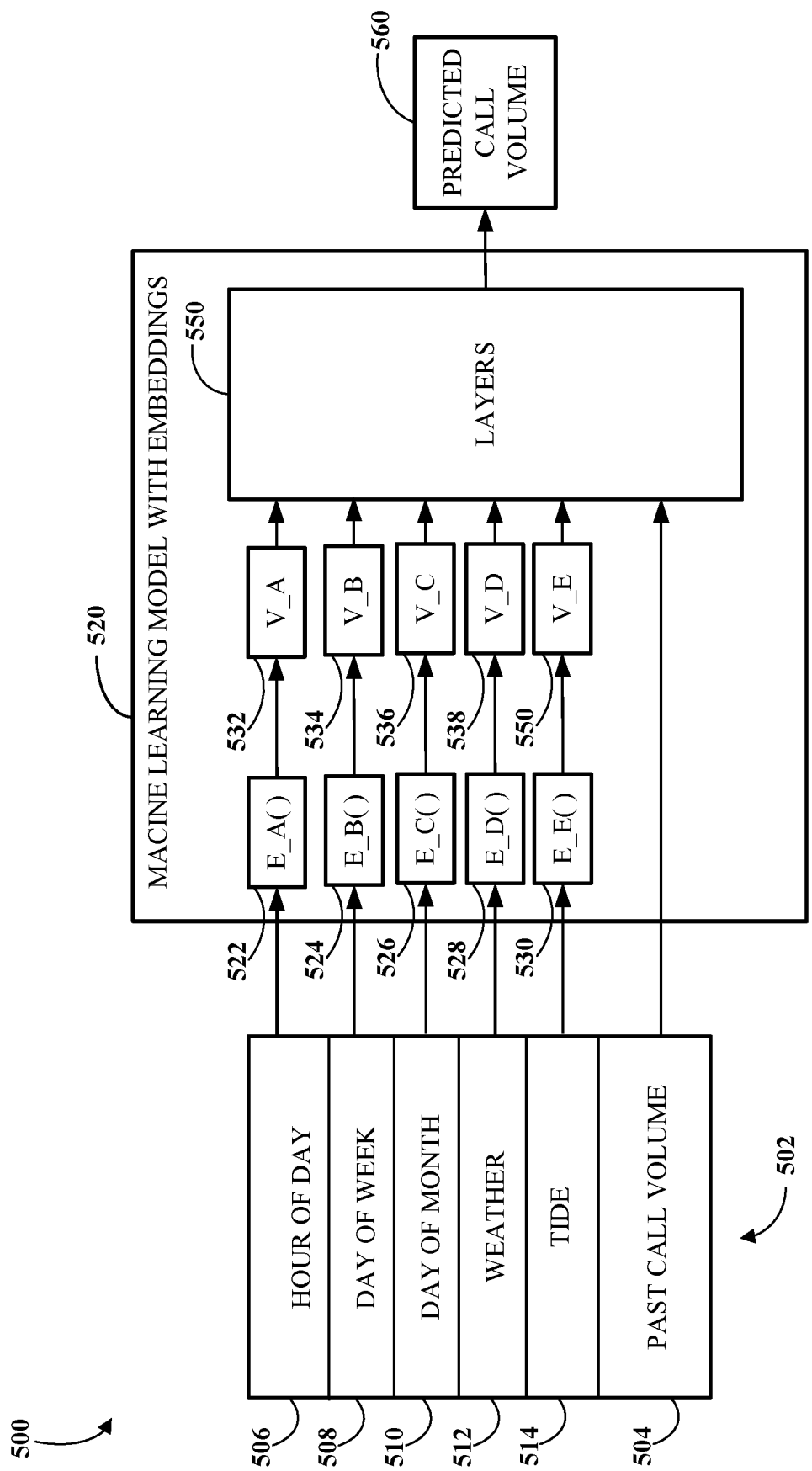
FIG. 5 is a block diagram of an example of a system for call volume prediction based on a time series of call volume data with time bin metadata including weather and tide indications.

FIG. 5 is a block diagram of an example of a system 500 for call volume prediction based on a time series of call volume data with time bin metadata including weather and tide indications. Weather may be correlated with call volume or other similar time series, such as website traffic volume. For example, inclement weather may cause people to stay indoors participate in more calls, driving up call volume. Similarly, tide may be correlated with call volume. For example, high tide in the summer may cause more people to stay off beaches and participate in more calls, driving up call volume. The system 500 includes a machine learning model 520 with embedding functions (522, 524, 526, 528, and 530). The machine learning model 520 is configured to take a window of a sequence of call volume measurements with the respective metadata as input and output a predicted call volume 560. FIG. 5 depicts a sequence element 502 that includes a past call volume 504 (e.g., a call volume measurement) and metadata for a time interval or bin corresponding to the past call volume 504 (e.g., a time period during which a call volume measurement was made). In this example, the metadata of the sequence element 502 includes an hour of the day 506, a day of the week 508, a day of the month 510, a weather indication 512 indicating the weather conditions in a region during the time period, and a tide indication 514 indicating a current phase in a tide cycle. For simplicity, FIG. 5 only depicts a single sequence element 502 being input to the machine learning model 520, but in practice a larger window of samples from this sequence may be input to the machine learning model 520 to obtain the predicted volume 560.

The machine learning model 520 includes embedding functions (522, 524, 526, 528, and 530) that are applied to the respective metadata for the call volume measurements in the window. When a window of sequence elements, including the sequence element 502, is input to the machine learning model 520, the metadata of the sequence element 502 are input to the corresponding embedding functions (522, 524, 526, 528, and 530) that have been trained to map these metadata to corresponding vectors (532, 534, 536, 538, and 540) in an embedding space. In some implementations, the embedding space for a piece of metadata may have a higher or lower dimension than the metadata itself. The machine learning model 520 also includes layers 550 (e.g., deep neural network layers) that take the embedding vectors (532, 534, 536, 538, and 540) along with the past call volume 504 as inputs and outputs the predicted call volume 560. For example, the layers 550 may include fully connected layers, convolutional layers, pooling layers, and/or recurrent layers. The predicted call volume 560 may be used to provision resources in network infrastructure. For example, one or more telephony servers may be activated based on the predicted call volume 560 for a UCaaS platform or a separate telephony platform.

In some implementations (not shown in FIG. 5), the machine learning model 520 may standardize or normalize the call volume measurements by mapping them to another space. For example, the call volume measurements may be shifted by a mean of call volume measurements in a set of training data or scaled by a standard deviation of call volume measurements in a set of training data.

In some implementations, the embedding functions (522, 524, 526, 528, and 530) have been trained using a sequence of network traffic measurements other than call volume measurements. For example, the embedding functions (522, 524, 526, 528, and 530) may have been trained using a sequence of website traffic measurements. The embedding functions (522, 524, 526, 528, and 530) may serve to transfer learning from a similar time series problem (e.g., website traffic prediction) to a new problem (e.g., call volume prediction) to reduce the amount training data and time required to converge to a state with acceptably accurate predictions.

Many other types of metadata may be used with associated embeddings instead of or in addition to the types of metadata described in relation to FIGS. 4 and 5. In some implementations, special events or stock market prices, may be indicated by channels of metadata associated with the call volume measurements. For example, a channel of metadata may be global, national, or local to a region. For example, a channel of metadata may be related to a specific company or business.

Figure 6:
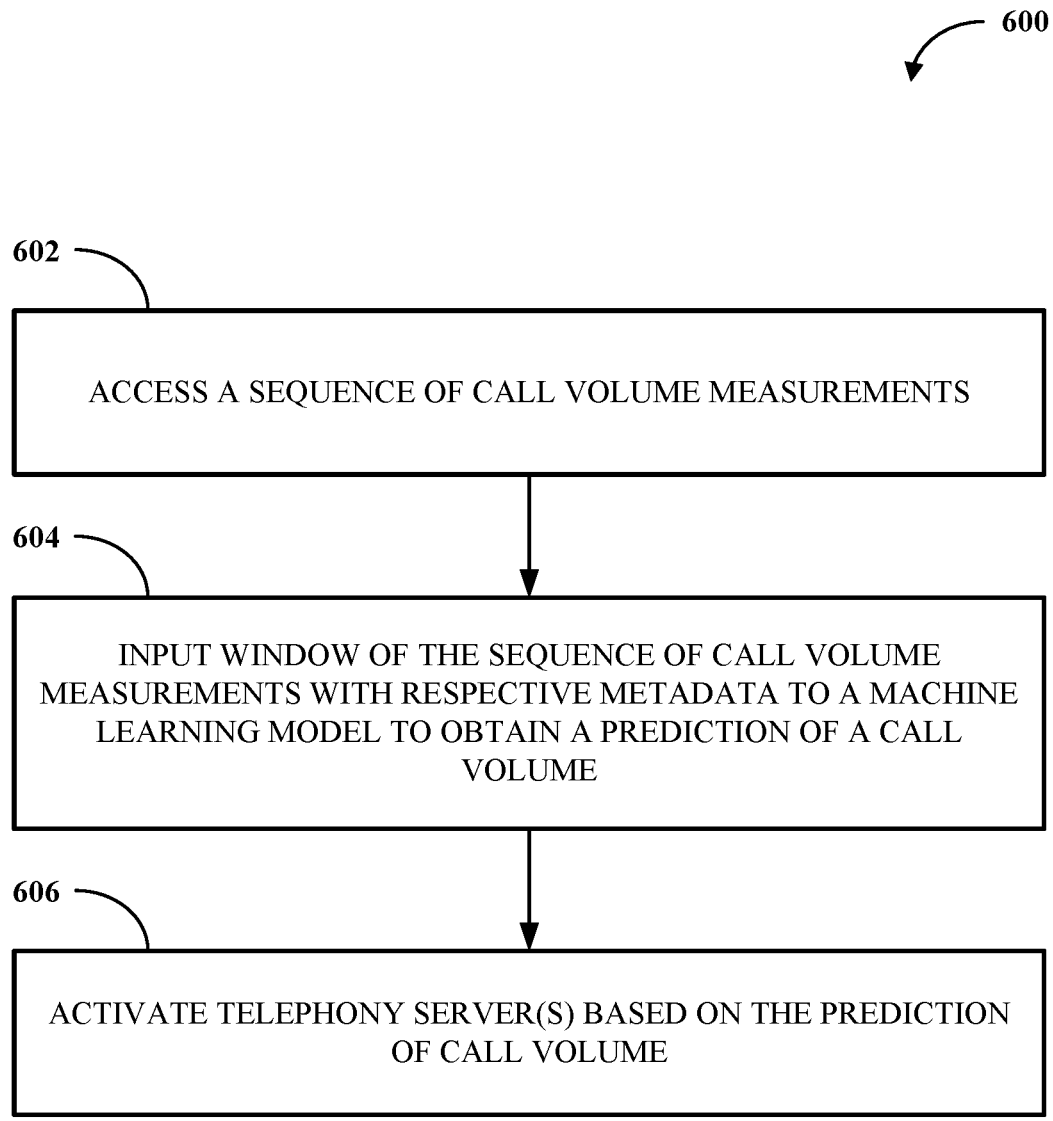
FIG. 6 is a flowchart of an example of a technique for call volume prediction based on a time series of call volume data with time bin metadata.

To further describe some implementations in greater detail, reference is next made to examples of techniques which may be used to implement a call volume prediction. FIG. 6 is a flowchart of an example of a technique 600 for call volume prediction based on a time series of call volume data with time bin metadata. The technique 600 can be executed using computing devices, such as the systems, hardware, and software described with respect to FIGS. 1-5. The technique 600 can be performed, for example, by executing a machine-readable program or other computer-executable instructions, such as routines, instructions, programs, or other code. The steps, or operations, of the technique 600 or another technique, method, process, or algorithm described in connection with the implementations disclosed herein can be implemented directly in hardware, firmware, software executed by hardware, circuitry, or a combination thereof.

For simplicity of explanation, the technique 600 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 602, the technique 600 includes accessing a sequence of call volume measurements for a unified communications as a service platform (e.g., for a UCaaS, which may include one or more telephony servers). Each of the call volume measurements is associated with respective metadata. The respective metadata (e.g., the respective metadata (406, 408, 410, 412, and 414) or the respective metadata (506, 508, 510, 512, and 514)) provides information regarding a time period during which a call volume measurement was made. In some implementations, the respective metadata for a call volume measurement in the sequence of call volume measurements includes at least one of a day of the week, an hour of the day, or day of the month for the call volume measurement. In some implementations, the respective metadata for a call volume measurement in the sequence of call volume measurements includes an indication of weather. For example, the indication of the weather may include a temperature for a region during the period of time. For example, the indication of the weather may include a precipitation level for a region during the period of time. In some implementations, the respective metadata for a call volume measurement in the sequence of call volume measurements includes an indication of tide level (e.g., a phase in a tide cycle).

At 604, the technique 600 includes inputting a window of the sequence of call volume measurements with the respective metadata to a machine learning model (e.g., the machine learning model 420 or the machine learning model 520) to obtain a prediction of a call volume (e.g., for the UCaaS). The machine learning model includes embedding functions (e.g., the embedding functions (422, 424, 426, 428, and 430) or the embedding functions (522, 524, 526, 528, and 530)) that are applied to the respective metadata for the call volume measurements in the window. These pieces of metadata may be mapped to embedding vectors using the trained embedding functions. The resulting embedding vectors may be input to other layers (e.g., the layers 450) of the machine learning model (e.g., including a deep neural network) along with the call volume measurements to obtain the prediction of a call volume. Embeddings are learned continuous vector representations of discrete variables. These pieces of metadata may be mapped to embedding vectors using trained embedding functions. The embedding functions may be implemented with a set of parameters that control linear and/or nonlinear functions applied to a discrete input (i.e., a portion of the respective metadata) to map the discrete variable to a (approximately) continuous vector space, called an embedding space. These parameters may be adapted or trained as part of a training process for a larger machine learning model in which they are included (e.g., trained using a back propagation algorithm). Embeddings may be trained in one machine learning model and copied into another machine learning model applied in a related but different application to transfer information relevant to both problems from one machine learning model to the other machine learning model. In some implementations, the embedding functions have been trained using a sequence of network traffic measurements other than call volume measurements. For example, the embedding functions may have been trained using a sequence of website traffic measurements. For example, a call volume in a period of time may be predicted based on call volume data for a sequence of time bins (e.g., every minute, every hour, or every day) in a window of preceding time (e.g., the last 72 hours).

At 606, the technique 600 includes activating one or more telephony servers (e.g., the telephony server 112) based on the prediction of the call volume (e.g., for the UCaaS). For example, if the prediction of the call volume is above a threshold, one or more telephony servers may be activated at the start of the period of time corresponding to the prediction of call volume. In some implementations, a number of servers activated may be proportional to an amount by which the prediction of call volume exceeds an earlier forecast. In some implementations, if the prediction of the call volume is below a threshold, one or more telephony servers may be deactivated at the start of the period of time corresponding to the prediction of call volume. Accurate provisioning of servers in a network infrastructure may enable the conservation of electrical power and/or other resources in the network while avoiding service degradation due to server capacity constraints. The technique 600 may provide advantages, such as providing accurate prediction for call volume or other types of network traffic based on limited data sets. For example, the predictions may enable an efficient deployment of computing resources in a telecommunications infrastructure.

In some implementations, other actions may be performed based on the prediction of the call volume. For example, temperature in a server room may be adjusted up or down in anticipation of changes in call volume (e.g., lowering temperature in anticipation of a surge in call volume).

In another example, a communications network infrastructure system includes multiple data centers to host its servers (e.g., physical data centers or cloud-based data centers). Network traffic is divided between the data centers according to a policy. The system has a capability to divert all traffic from one data center to another. By training a machine learning model on time series data of a volume of server errors at occurring at each data center, the system can predict whether the frequency of errors in a data center will increase and preemptively divert traffic (e.g., all traffic) from the affected data center to the other data center. This technique may address the problem of knowing when to divert traffic from a data center and may reduce total server errors.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
   accessing a sequence of call volume measurements, wherein each of the call volume measurements is associated with respective metadata, and wherein the respective metadata provides information regarding a time period during which a call volume measurement was made; and
   inputting a window of the sequence of call volume measurements with the respective metadata to a machine learning model to obtain a prediction of a call volume, the machine learning model includes embedding functions that are applied to the respective metadata for the call volume measurements in the window, wherein the embedding functions are implemented with a set of parameters that control nonlinear functions applied to a discrete variable of the respective metadata for the call volume measurements in the window to map the discrete variable to a continuous vector space.

2. The method of claim 1, wherein the embedding functions have been trained using a sequence of network traffic measurements other than call volume measurements.

3. The method of claim 1, wherein the embedding functions have been trained using a sequence of website traffic measurements.

4. The method of claim 1, wherein the respective metadata for a call volume measurement in the sequence of call volume measurements includes at least one of a day of the week, an hour of the day, or day of the month for the call volume measurement.

5. The method of claim 1, comprising:
   activating one or more telephony servers based on the prediction of the call volume.

6. The method of claim 1, wherein the respective metadata for a call volume measurement in the sequence of call volume measurements includes an indication of weather.

7. The method of claim 1, wherein the respective metadata for a call volume measurement in the sequence of call volume measurements includes an indication of tide level.

8. A system comprising:
   a processor, and a memory, wherein the memory stores instructions executable by the processor to:

access a sequence of call volume measurements for one or more telephony servers, wherein each of the call volume measurements is associated with respective metadata, and wherein the respective metadata provides information regarding a time period during which a call volume measurement was made; and input a window of the sequence of call volume measurements with the respective metadata to a machine learning model to obtain a prediction of a call volume for the one or more telephony servers, wherein the machine learning model includes embedding functions that are applied to the respective metadata for the call volume measurements in the window, wherein the embedding functions are implemented with a set of parameters that control nonlinear functions applied to a discrete variable of the respective metadata for the call volume measurements in the window to map the discrete variable to a continuous vector space.

9. The system of claim 8, wherein the embedding functions have been trained using a sequence of network traffic measurements other than call volume measurements.

10. The system of claim 8, wherein the embedding functions have been trained using a sequence of website traffic measurements.

11. The system of claim 8, wherein the respective metadata for a call volume measurement in the sequence of call volume measurements includes at least one of a day of the week, an hour of the day, or day of the month for the call volume measurement.

12. The system of claim 8, wherein the memory stores instructions executable by the processor to:

activate one or more telephony servers based on the prediction of the call volume for the one or more telephony servers.

13. The system of claim 8, wherein the respective metadata for a call volume measurement in the sequence of call volume measurements includes an indication of weather.

14. The system of claim 8, wherein the respective metadata for a call volume measurement in the sequence of call volume measurements includes an indication of tide level.

15. A non-transitory computer-readable storage medium, comprising executable instructions that, when executed by a processor, facilitate performance of operations, comprising:

accessing a sequence of call volume measurements for a unified communications as a service platform, wherein each of the call volume measurements is associated with respective metadata, and wherein the respective metadata provides information regarding a time period during which a call volume measurement was made;

inputting a window of the sequence of call volume measurements with the respective metadata to a machine learning model to obtain a prediction of a call volume for the unified communications as a service platform, wherein the machine learning model includes embedding functions that are applied to the respective metadata for the call volume measurements in the window, wherein the embedding functions are implemented with a set of parameters that control nonlinear functions applied to a discrete variable of the respective metadata for the call volume measurements in the window to map the discrete variable to a continuous vector space; and activating one or more telephony servers based on the prediction of the call volume for the unified communications as a service platform.

16. The non-transitory computer-readable storage medium of claim 15, wherein the embedding functions have been trained using a sequence of network traffic measurements other than call volume measurements.

17. The non-transitory computer-readable storage medium of claim 15, wherein the embedding functions have been trained using a sequence of website traffic measurements.

18. The non-transitory computer-readable storage medium of claim 15, wherein the respective metadata for a call volume measurement in the sequence of call volume measurements includes at least one of a day of the week, an hour of the day, or day of the month for the call volume measurement.

19. The non-transitory computer-readable storage medium of claim 15, wherein the respective metadata for a call volume measurement in the sequence of call volume measurements includes an indication of weather.

20. The non-transitory computer-readable storage medium of claim 15, wherein the respective metadata for a call volume measurement in the sequence of call volume measurements includes an indication of tide level.

* * * * *